(12) United States Patent
Aronis et al.

(10) Patent No.: US 12,531,145 B2
(45) Date of Patent: Jan. 20, 2026

(54) SYSTEM AND METHOD FOR REAL-TIME GUIDANCE OF AN ELECTROPHYSIOLOGY CATHETER FOR TARGETING A LOCATION OF ORIGIN OF AN ARRHYTHMIA

(71) Applicant: THE JOHNS HOPKINS UNIVERSITY, Baltimore, MD (US)

(72) Inventors: Konstantinos N. Aronis, Baltimore, MD (US); Ronald D. Berger, Baltimore, MD (US); Natalia A. Trayanova, Baltimore, MD (US); Shijie Zhou, Baltimore, MD (US); Harikrishna Tandri, Ellicott City, MD (US)

(73) Assignee: THE JOHNS HOPKINS UNIVERSITY, Baltimore, MD (US)

(*) Notice: Subject to any disclaimer, the term of this patent is extended or adjusted under 35 U.S.C. 154(b) by 862 days.

(21) Appl. No.: 17/781,503

(22) PCT Filed: Dec. 2, 2020

(86) PCT No.: PCT/US2020/062868
§ 371 (c)(1),
(2) Date: Jun. 1, 2022

(87) PCT Pub. No.: WO2021/113345
PCT Pub. Date: Jun. 10, 2021

(65) Prior Publication Data
US 2023/0011001 A1    Jan. 12, 2023

Related U.S. Application Data

(60) Provisional application No. 62/942,399, filed on Dec. 2, 2019.

(51) Int. Cl.
*G16H 20/40*    (2018.01)

(52) U.S. Cl.
CPC .................................. *G16H 20/40* (2018.01)

(58) Field of Classification Search
CPC ........ G16H 20/40; G16H 50/20; G16H 40/67; A61B 5/066; A61B 5/287; A61B 5/367;
(Continued)

(56) References Cited

U.S. PATENT DOCUMENTS

| | | | | |
|---|---|---|---|---|
| 2005/0197587 A1* | 9/2005 | Rudy | ................... | A61B 5/6856 600/509 |
| 2007/0244479 A1* | 10/2007 | Beatty | .................. | A61B 5/0538 606/41 |

(Continued)

FOREIGN PATENT DOCUMENTS

| | | |
|---|---|---|
| CA | 3017925 A1 | 4/2019 |
| WO | 2007067628 A1 | 6/2007 |
| WO | 2016181318 A1 | 11/2016 |

OTHER PUBLICATIONS

Bykovskaya, S. (RU Authorized Officer), International Search Report and Written Opinion issued Mar. 4, 2021 in corresponding International Application No. PCT/US2020/062868, 6 pages.

(Continued)

*Primary Examiner* — Joel Lamprecht
*Assistant Examiner* — Amy Shafqat
(74) *Attorney, Agent, or Firm* — MH2 Technology Law Group LLP

(57) ABSTRACT

A system and method are provided for a navigational feedback to a catheter during an arrhythmia ablation procedure. A set of electrocardiogram (ECG) signals of a patient's arrhythmia is recorded that correspond to an unknown target location to be ablated by the catheter. During the ablation procedure, pacing locations and ECG signals corresponding to the pacing locations are collected to derive a mathematical operator that maps a 12-dimensional displacement vector in the ECG space to a 3-dimensional (3D) vector in a (Continued)

physical space. This 3D vector corresponds to a direction and a distance that the catheter needs to be moved in order to reach the target location of the arrhythmia.

15 Claims, 10 Drawing Sheets

(58) Field of Classification Search
CPC ..... A61B 5/6852; A61B 5/7425; A61B 34/10; A61B 18/1492; A61B 34/20; A61B 2018/00357; A61B 2018/00577; A61B 2018/00839; A61B 2034/105; A61N 1/365

See application file for complete search history.

(56) References Cited

U.S. PATENT DOCUMENTS

| | | |
|---|---|---|
| 2008/0234564 A1 | 9/2008 | Beatty et al. |
| 2018/0214030 A1* | 8/2018 | Migeotte ................ A61B 5/318 |

OTHER PUBLICATIONS

Piorkowski, C., "Mapping-guided characterization of mechanical and electrical activation patterns in patients with normal systolic function using a sensor-based tracking technology," European Society of Cardiology, Europace, 2017, pp. 1700-1709, vol. 19.

* cited by examiner

RESULTS: PATIENT 1 - EFFECT OF THE ADDITION OF A PACE MAP POINT
NEAR THE PREDICTED VA LOCATION

ERROR: 1.83mm

SYSTEM AND METHOD FOR REAL-TIME GUIDANCE OF AN ELECTROPHYSIOLOGY CATHETER FOR TARGETING A LOCATION OF ORIGIN OF AN ARRHYTHMIA

CROSS-REFERENCE TO RELATED APPLICATIONS

This application is a national stage entry from International Application No. PCT/US2020/062868, filed on Dec. 2, 2020, published as International Publication No. WO 2021/113345 A1 on Jun. 10, 2021, and claims the benefit of U.S. Provisional Patent Application No. 62/942,399, filed on Dec. 2, 2019, the disclosures of which are hereby incorporated by reference in their entireties.

FEDERAL FUNDING

This invention was made with Government support of Grant No. 5T32HL007227-42 and R01HL142496, awarded by NIH. The U.S. Government has certain rights in this invention.

BACKGROUND

1. Technical Field

The field of the currently claimed embodiments of this invention relates to systems and methods for catheter ablation to treat ventricular arrhythmias (VAs), and more particularly to real-time catheter guidance for catheter ablation to treat VAs.

2. Discussion of Related Art

VAs are common arrhythmias associated with morbidity, mortality and impaired quality of life. Catheter ablation is a procedure performed to treat VAs. During this procedure an operator (e.g., an operating electrophysiologist) makes empirical decisions on how to navigate a catheter in a patients' heart to reach an area from which VAs originate. Catheter navigation is highly dependent on the operator's experience and frequently the operator spends a long time in "trial and error" attempts to localize a VA origin. This empirical, "trial and error" approach has two hindrances: (1) a successful localization highly depends on the experience of the operator; and (2) it is time consuming resulting in long procedure times.

There is a large unmet need in technologies to assist with the improvement of VA ablation procedures. Currently the success rate of ablation procedures is at best moderate. Most importantly, successful VA ablation procedures take place primarily in large tertiary or academic centers due to the need for experienced operators. Also, lengthy VA ablation procedure times can result in adverse outcomes.

SUMMARY

An embodiment of the current invention is directed to a method of real-time guidance of an electrophysiology catheter for targeting a location of origin of an arrhythmia. The method includes receiving a 3-dimensional representation of at least a portion of a cardiac chamber; receiving a plurality of pacing locations with respect to said representation of at least said portion of said cardiac chamber for a corresponding plurality of pacing stimulations; receiving a plurality of corresponding sets of electrocardiogram (ECG) signals from an n-lead ECG system in response to each of said pacing stimulations from said pacing locations; constructing a plurality of 3-dimensional physical displacement vectors from pairs of pacing locations of said plurality of pacing locations; constructing a plurality of n-dimensional ECG integral displacement vectors from pairs of sets of ECG signals of said plurality of sets of ECG signals, that correspond to said plurality of 3-dimensional physical displacement vectors; deriving a transformation operator based on said plurality of n-dimensional ECG integral displacement vectors and said plurality of 3-dimensional physical displacement vectors; receiving a set of ECG signals of said arrhythmia; constructing a n-dimensional ECG integral displacement vector from said set of ECG signals of said arrhythmia and one set of ECG signals from said plurality of sets of ECG signals corresponding to said plurality of pacing locations; applying said transformation operator to said n-dimensional ECG integral displacement vector to obtain a 3-dimensional displacement vector corresponding to said location of origin of said arrhythmia relative to said pacing location; and displaying said three-dimensional displacement vector on said 3-dimensional representation of at least said portion of said cardiac chamber.

A computer-readable medium for real-time guidance of an electrophysiology catheter for targeting a location of origin of an arrhythmia according to an embodiment of the current invention includes non-transitory computer-executable code. The non-transitory computer-executable code, when executed by a computer, causes the computer to: receive a 3-dimensional representation of at least a portion of a cardiac chamber; receive a plurality of pacing locations with respect to said representation of at least said portion of said cardiac chamber for a corresponding plurality of pacing stimulations; receive a plurality of corresponding sets of electrocardiogram (ECG) signals from an n-lead ECG system in response to each of said pacing stimulations from said pacing locations; construct a plurality of 3-dimensional physical displacement vectors from pairs of pacing locations of said plurality of pacing locations; construct a plurality of n-dimensional ECG integral displacement vectors from pairs of sets of ECG signals of said plurality of sets of ECG signals, that correspond to said plurality of 3-dimensional physical displacement vectors; derive a transformation operator based on said plurality of n-dimensional ECG integral displacement vectors and said plurality of 3-dimensional physical displacement vectors; receive a set of ECG signals of said arrhythmia; construct a n-dimensional ECG integral displacement vector from said set of ECG signals of said arrhythmia and one set of ECG signals from said plurality of sets of ECG signals corresponding to said plurality of pacing locations; apply said transformation operator to said n-dimensional ECG integral displacement vector to obtain a 3-dimensional displacement vector corresponding to said location of origin of said arrhythmia relative to said pacing location; and display said three-dimensional displacement vector on said 3-dimensional representation of at least said portion of said cardiac chamber.

A system for real-time guidance of an electrophysiology catheter for targeting a location of origin of an arrhythmia includes a data processor. The data processor is configured to: receive a 3-dimensional representation of at least a portion of a cardiac chamber; receive a plurality of pacing locations with respect to said representation of at least said portion of said cardiac chamber for a corresponding plurality of pacing stimulations; receive a plurality of corresponding sets of electrocardiogram (ECG) signals from an n-lead ECG system in response to each of said pacing stimulations from said pacing locations; construct a plurality of 3-dimensional physical displacement vectors from pairs of pacing locations of said plurality of pacing locations; construct a plurality of n-dimensional ECG integral displacement vectors from pairs of sets of ECG signals of said plurality of sets of ECG signals, that correspond to said plurality of 3-dimensional physical displacement vectors; derive a transformation operator based on said plurality of n-dimensional ECG integral displacement vectors and said plurality of 3-dimensional physical displacement vectors; receive a set of ECG signals of said arrhythmia; construct a n-dimensional ECG integral displacement vector from said set of ECG signals of said arrhythmia and one set of ECG signals from said plurality of sets of ECG signals corresponding to said plurality of pacing locations; apply said transformation operator to said n-dimensional ECG integral displacement vector to obtain a 3-dimensional displacement vector corresponding to said location of origin of said arrhythmia relative to said pacing location; and display said three-dimensional displacement vector on said 3-dimensional representation of at least said portion of said cardiac chamber.

BRIEF DESCRIPTION OF THE DRAWINGS

Further objectives and advantages will become apparent from a consideration of the description, drawings, and examples.

DETAILED DESCRIPTION

Figure 1:
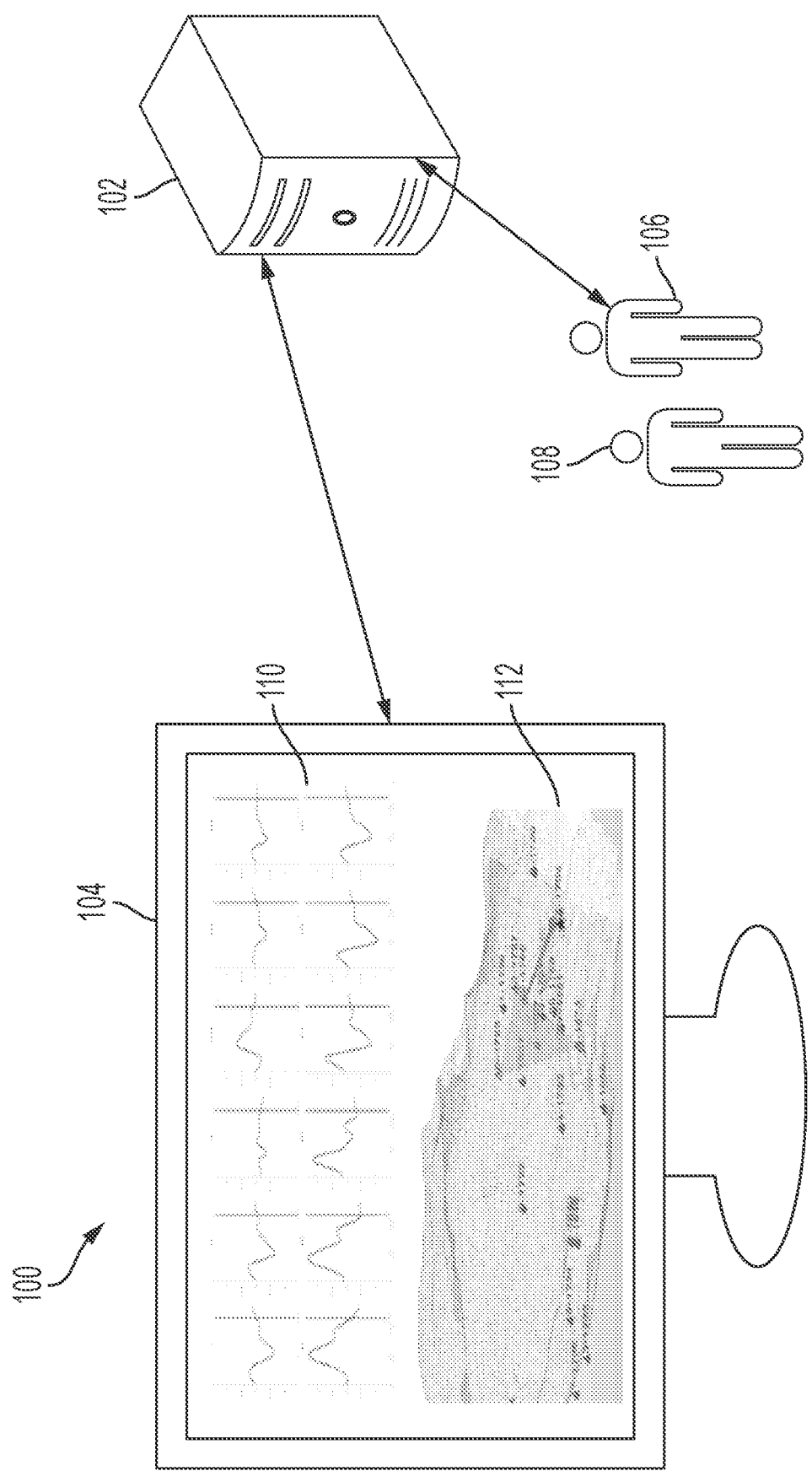
FIG. 1 shows a schematic diagram of a general environment in which the disclosed system may be implemented according to an embodiment of the current invention.

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

There are limited available technologies that predict the location of VA origin using ECG. These technologies require a detailed anatomical representation of a ventricle, in addition to the ECG. These anatomical representations can be either detailed anatomical maps obtained intra-procedurally, or three-dimensional cardiac reconstructions derived from cross-sectional cardiac imaging such as cardiac computed tomography or cardiac magnetic resonance imaging. Detailed anatomical maps require a significant amount of time to acquire intra-procedurally. Cardiac imaging is an additional cost for the procedure. None of these technologies provide navigational feedback of which direction an operating electrophysiologist needs to steer a catheter in order to reach the VA origin. The present disclosure provides the first technology that determines the origin of VA without the need of a detailed ventricular anatomical representation. It uses a relative reference frame (e.g., a current location of the catheter) to express the direction that the catheter needs to be steered towards. It is the first technology that provides real-time navigational feedback regarding which direction the operating electrophysiologist needs to steer the catheter in order to reach the VA origin. This is also the first technology that can incorporate more information in real-time and adjust the navigational guidance to new data. Some embodiments of the current invention can allow for VA ablation procedures to be performed in medical centers with less experience in VA ablation and to be completed in reduced procedural time, resulting in improved clinical outcomes.

Some embodiments of the current invention can provide a system and method that uses a 12-lead surface electrocardiogram (ECG) technology to localize in real time an origin of ventricular arrhythmias (VA). This system and method can provide a navigational feedback to an operator (e.g., an operating electrophysiologist) during VA ablation procedures. Prior to an ablation procedure of VA, this system and method can capture or receive an ECG waveform of a patient's VA from any device that is capable of recording the ECG. The VA ECG waveform corresponds to an unknown location of the VA, which is a target location where the ablation should be performed by the operator to ablate the origin of the VA. During the ablation procedure, the operator can pace the patient's heart using a catheter, (e.g., the left ventricle or the right ventricle) in a limited number of locations. The locations of the pacing catheter and the ECG wave-forms corresponding to the locations can be collected by an embodiment of the current system intra-procedurally. A 12-dimensional displacement vector can be defined in the ECG space from the ECG waveforms between all possible pairs of pacing locations and the VA ECG waveform. These data can then be combined and used to derive a mathematical operator that maps the 12-dimensional displacement vector in the ECG space to a 3-dimensional (3D) displacement vector in a physical space. Some embodiments of the current system and method displays this 3D displacement vector on an electroanatomic map screen that the operator uses during the ablation procedure to provide real-time navigational feedback to the operator. This 3D displacement vector corresponds to a direction that the operator needs to move the catheter in order to reach the target location of the VA. Some embodiments of the current system and method can provide feedback if the VA target location is determined to be on the opposite ventricle or in the epicardial surface. Some embodiments can also integrate additional ECG waveforms from any new locations that the operator paces the patient's heart, as well as a ventricular geometry as obtained by intracardiac contact catheters. This can be used by the current system and method to improve the accuracy of VA localization in real time.

In some embodiments, the present invention provides a precise system to provide real-time navigational guidance to an operating electrophysiologist to reach an origin of the VA quickly and precisely. Navigation of a catheter for ablating the VA can be system-based and does not rely on the experience of the operating electrophysiologist. Some embodiments of the current system can guide the operating electrophysiologist closer to the origin of the VA and continuously update the predicted location of the VA such as multiple "trial and error" attempts are no longer required. This is a groundbreaking improvement to current technology. This is the first technology that can determine the origin of VA without the need of a detailed ventricular anatomical map or representation and can provide real-time navigational feedback to the operating electrophysiologist for steering the catheter. As such, some embodiments of the present invention solves the problems associated with the current technology as described above.

FIG. 1 illustrates a schematic diagram of a general environment in which a system 100 may be implemented according to an embodiment of the current invention. The system 100 includes a device 102 and a display 104 in communication with the device 102.

The device 102 may be a diagnostic or therapeutic device such as an electroanatomic mapping device, an electrophysiological system device, or an arrhythmia ablation device. The device 102 may include a computing device. The computing device may be a mobile device (e.g., tablet, smartphone, etc.), a desktop computer, a laptop computer, a server, a wearable device, a mainframe computer, and/or any suitable device with computing capability or a dedicated hardware device. The computing device may be configured to have or be in communication with one or more memory devices storing data and/or software instructions (e.g., database(s), memory devices). When executed by the computing device, the software instructions may cause the computing device to perform one or more operations consistent with the disclosed embodiments. The device 102 may include a non-transitory computer-readable medium embodying software instructions when executed, that causes the device 102 to perform one or more operations disclosed in the present disclosure.

The display 104 may include, for example, a liquid crystal display (LCD), a light emitting diode screen (LED), an organic light emitting diode screen (OLED), a touch screen, or other known display screen. The display screen 104 may display various kinds of information consistent with the disclosed embodiments.

An operator 106 (e.g., an operating electrophysiologist) may use the device 102 to perform one or more operations on a patient 108, such as a VA ablation. The operator 102 may employ a catheter that is positioned in a ventricle of the patient 108 to conduct a pace mapping at various locations inside the ventricle. A multiple-lead surface ECG may be recorded at each of the various locations in response to the pace mapping at that location. The multiple-lead surface ECG may be displayed on the display 104, for example, a 12-lead surface ECG 110. A clinical 12-lead ECG of a target VA may be recorded or received by the device 102, and may also be displayed on the display 104. By executing the software instructions, a 12-dimensional displacement vector in ECG space between pace map locations and the target VA location can be defined. A transformation operator may be estimated and applied by executing the software instructions that maps the 12-dimensional displacement vector in ECG space to a 3D displacement vector in physical space. The 3D displacement vector in the physical space can represent a direction that the catheter needs to be steered to reach the target VA location from the current location of the catheter. This navigational feedback can be displayed on the display 104 and provided to the operator 106, such that the operator 106 can move the ablation catheter following the navigational feedback. Further, new pace map locations and corresponding ECGs may be captured by the device 102 and the process is repeated until the target VA location is reached. This can be schematically shown in an image 112 on the display 104.

Figure 2:
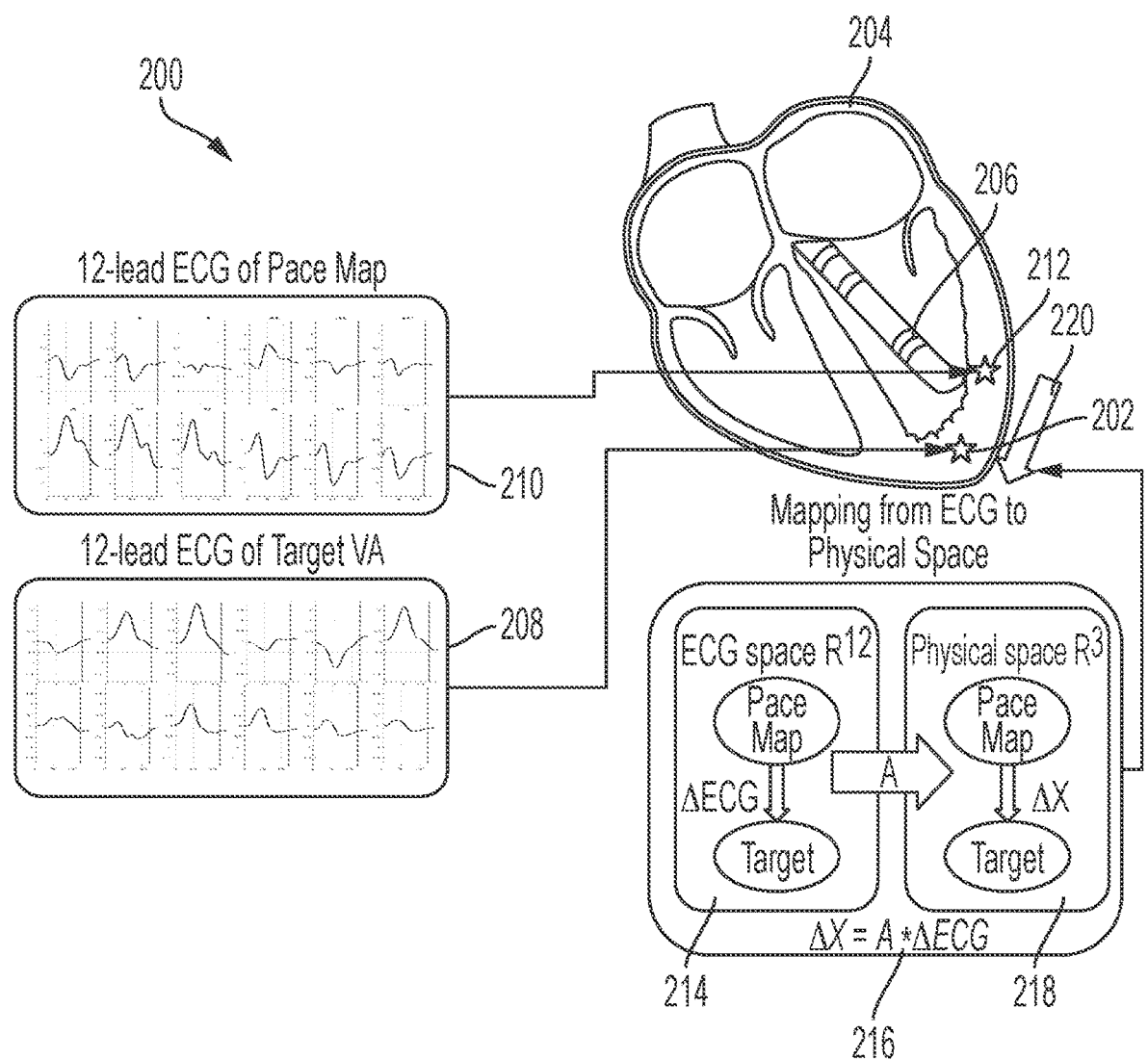
FIG. 2 shows a schematic diagram of a catheter approaching a target location of a VA during a VA ablation procedure, according to an embodiment of the current invention.

FIG. 2 illustrates a schematic diagram 200 of a catheter approaching a target location of a VA during a VA ablation process that may be displayed on the display 104 in FIG. 1, according to one embodiment of the present invention. To ablate a target VA at an unknown location 202 in a ventricle 204 of a patient, an ablation catheter 206 can be used to pace map the ventricle 204 at a set of locations of the ventricle 204. A plurality of corresponding sets of n-lead ECG signals can be recorded at the set of locations, and each set of n-lead ECG signals correspond to one location. An n-dimensional displacement vector in ECG space between a pair of pace map locations can be defined, where the n can be any positive integers. For example, if the n is 12, then the n-lead ECG signal is a 12-lead ECG signal and the n-dimensional displacement vector in ECG space is a 12-dimensional displacement vector in ECG space. A transformation operator A may be derived to map the n-dimensional displacement vector in ECG space to a 3D displacement vector in physical space. The 3D displacement vector in the physical space corresponds to a 3D physical displacement vector between one location of the pair of pace map locations and the other location of the pair of pace map locations. The 3D displacement vector in the physical space can represent a direction and a distance that the catheter needs to be moved from a first location of the catheter (e.g., the one location of the pair of pace map locations) to a second position of the catheter (e.g., the other location of the pair of pace map locations).

For example, as shown in FIG. 2, a 12-lead ECG 208 of the target VA at the unknown location 202 may be recorded prior to or during the ablation procedure. The 12-lead ECG 208 of the target VA may be recorded by any device capable of recording a surface ECG, for example, the device 102 in FIG. 1 or a portable ECG recording device. The 12-lead ECG 208 of the target VA, if not generated and recorded by the disclosed system herein (e.g., may be recorded by a portable ECG recording device external to the disclosed system herein), can be received and stored into the disclosed system herein (e.g., into the device 102 in the FIG. 1), for example, from the external portable device. A corresponding 12-lead ECG 210 may be recorded at a location 212 in the ventricle 204. To guide the operator of the ablation catheter 206 to move the catheter 206 from the location 212 toward the unknown location 202 for ablating the target VA, a 12-dimensional displacement vector in ECG space can be defined between the 12-lead ECG 210 at the location 212 and the 12-lead ECG 208 of the unknown location 202, as indicated in a block 214. The 12-dimensional displacement vector in ECG space is derived, for example, by integrating over a period of time an ECG difference (i.e., ΔECG) between each component of the 12-lead ECG 210 and each corresponding component of the 12-lead ECG 208. The period time can be, for example, from about 0 millisecond to about 80 milliseconds, from about 0 millisecond to about 120 milliseconds, or from about 80 milliseconds to about 120 milliseconds. The details of the integration will be described later in FIG. 3.

A 12-lead ECG comprises 12 components, as shown in 210 and 208. As such, the 12-dimensional displacement vector in ECG space comprises 12 components, each of which is a time integral over the period of time of ΔECG between each component of the 12-lead ECG 210 and each corresponding component of the 12-lead ECG 208. The transformation operator A can be applied to the 12-dimensional displacement vector in ECG space to obtain a 3D displacement vector in the physical space (i.e. ΔX space), as indicated by the formula 216. The resulting 3D displacement vector in the physical space can represent a direction and a distance from the location 212 of the catheter 206 to the unknown location 202 of the target VA, as indicated by a block 218. The resulting 3D displacement vector can be projected onto the diagram of the ventricle 204, as indicated by an arrow 220 which can be displayed on the display 104 in FIG. 1. The operator of the catheter 206 can use the arrow 220 as a navigational feedback to move the catheter 206 from the location 212 to the unknown location 202 along the arrow 220. As such, the catheter 206 can quickly and effectively reach the target VA location from the current location of the catheter 206. Once arriving at the location 202, an ablation of the target VA can be performed there.

Figure 3:
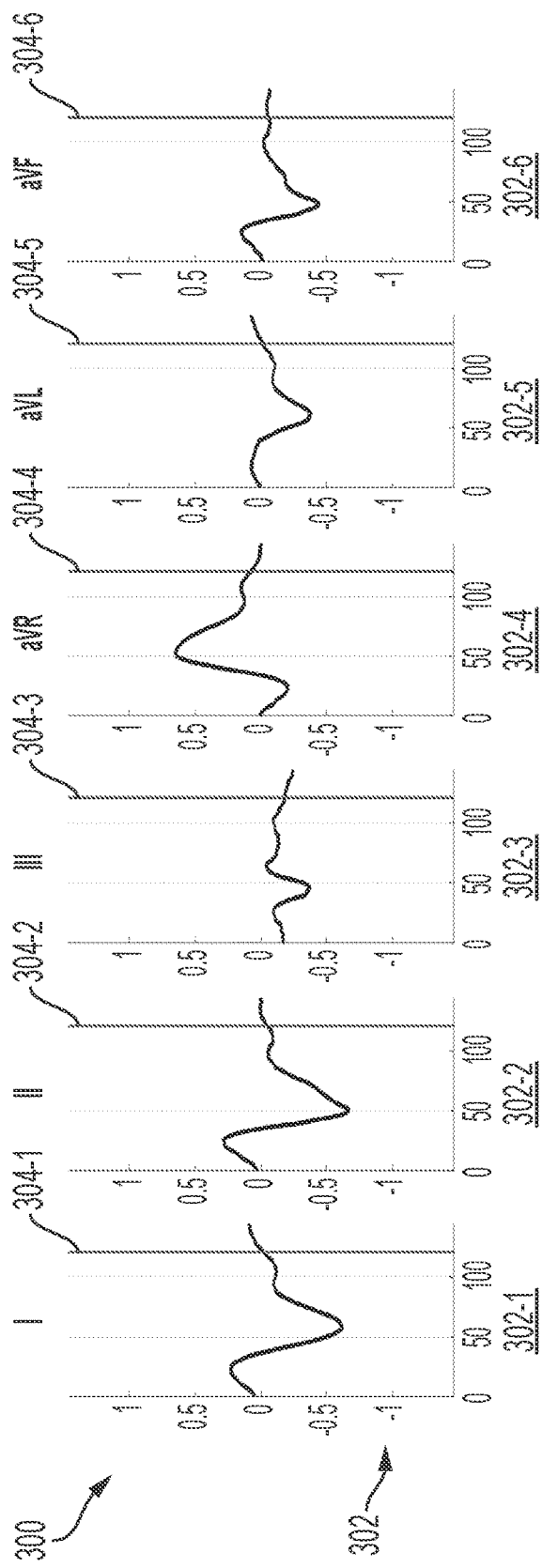
FIG. 3 shows a schematic diagram of deriving an example 12-dimensional displacement vector in ECG space, according to an embodiment of the current invention.
Figure 3:
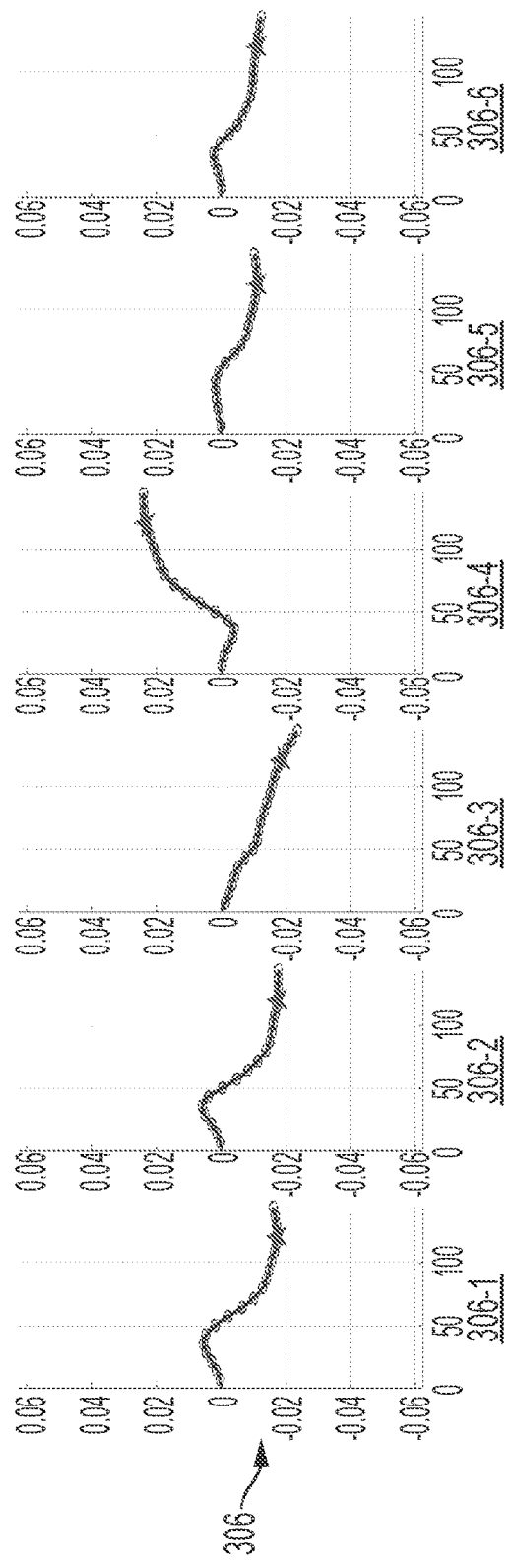
Figure 3:
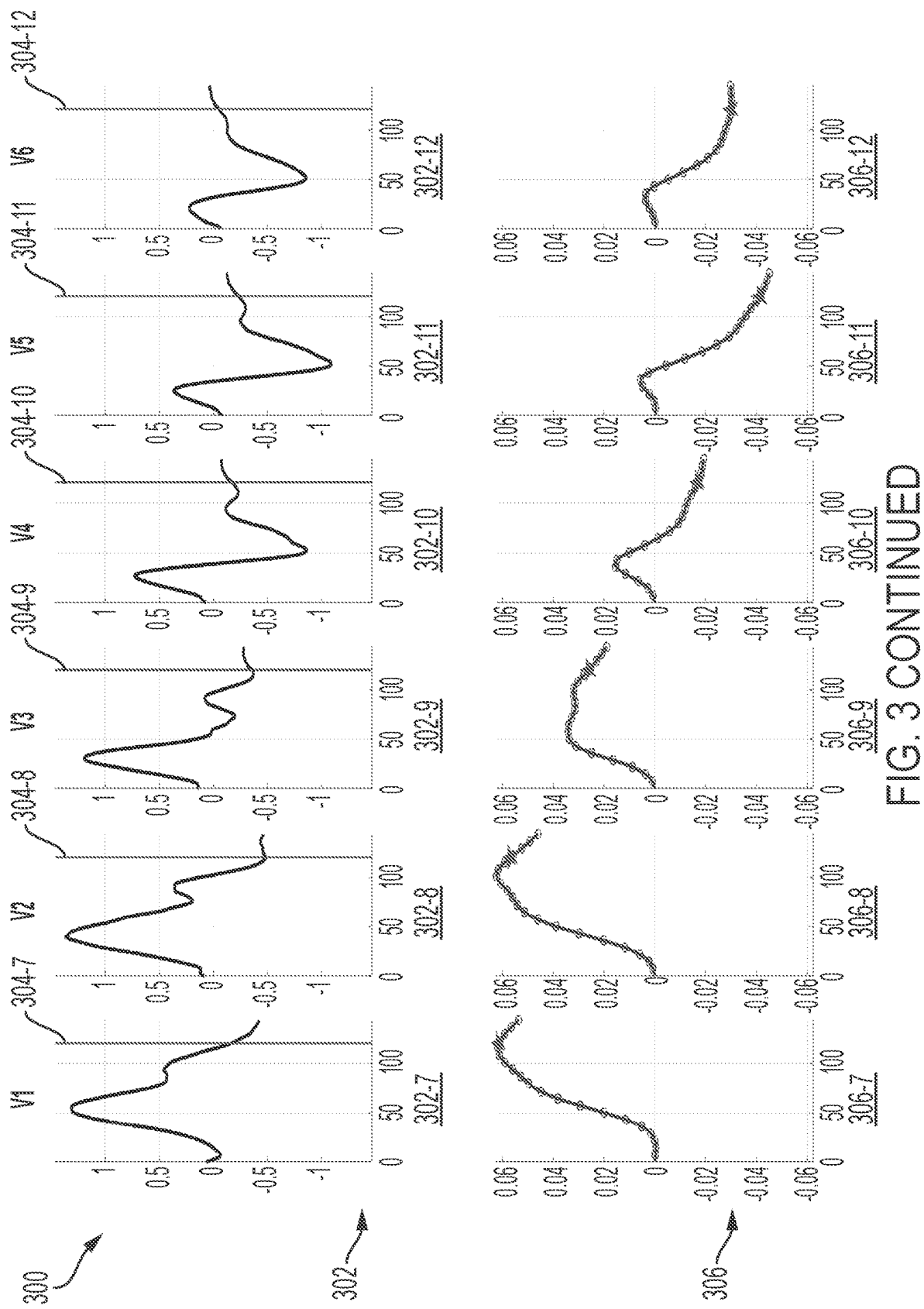

FIG. 3 shows a schematic diagram 300 of deriving an example 12-dimensional displacement vector in ECG space, according to an embodiment of the current invention. In this example, the n-dimensional displacement vector in ECG space is a 12-dimensional displacement vector in ECG space. To derive the 12-dimensional displacement vector, two sets of 12-lead ECG signals are recorded at two respective ventricle locations by a 12-lead surface ECG device. For simplicity, FIG. 3 shows only one of the two set of 12-lead ECGs, that is, a set of ECGs 302. Each component ECG of the set of ECGs 302 corresponds to a lead of the 12 leads, which is labeled as 302-1, 302-2, 302-3, 302-4, 302-5, 302-6, 302-7, 302-8, 302-9, 302-10, 302-11, and 302-12, respectively. The ECG signal is integrated over a period of time, for example, from 0 millisecond to the milliseconds indicated by the lines 304-1, 304-2, 304-3, 304-4, 304-5, 304-6, 304-7, 304-8, 304-9, 304-10, 304-11, and 304-12, respectively. The resulting integrals are shown in a diagram 306, each component integral of which is labeled as 306-1, 306-2, 306-3, 306-4, 306-5, 306-6, 306-7, 306-8, 306-9, 306-10, 3006-11. and 306-12 corresponding to each component ECG of the set of ECGs 302. Each component integral is one of the 12 components of the 12-dimensional displacement vector in ECG space. The 12-dimensional ECG integral displacement vector is defined between two corresponding component ECG integrals of the two 12-lead ECGs.

Figure 4:
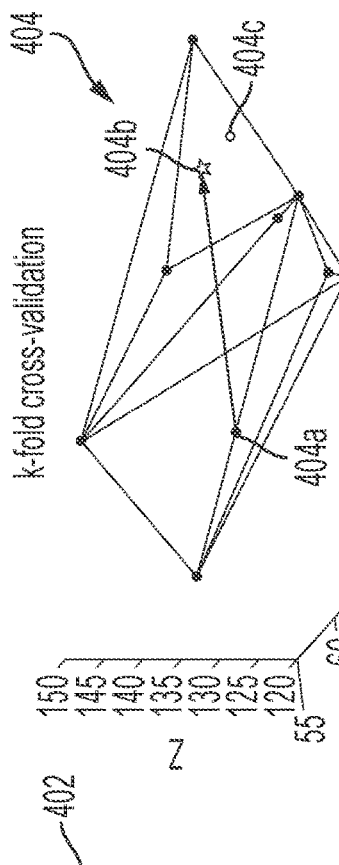
FIG. 4 shows results of validating a methodology of real-time guidance of an electrophysiology catheter for targeting a location of origin of an arrhythmia applied to an example left ventricle of a patient during pacing in the ventricles at different locations.
Figure 4:
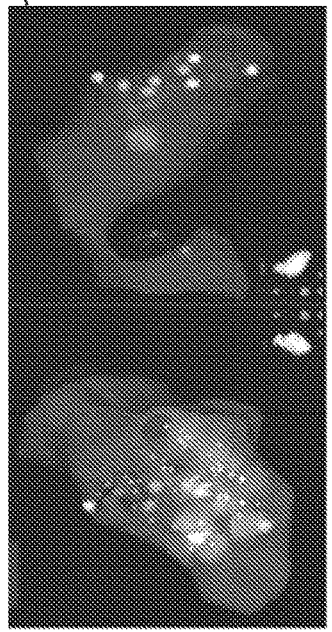
Figure 4:
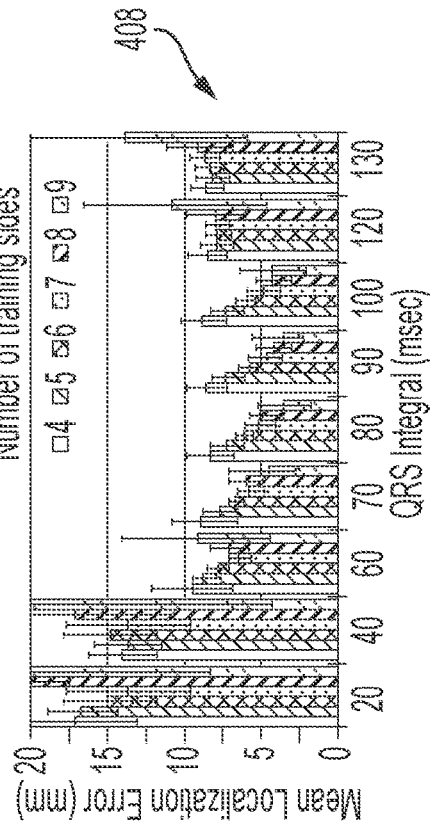
Figure 4:
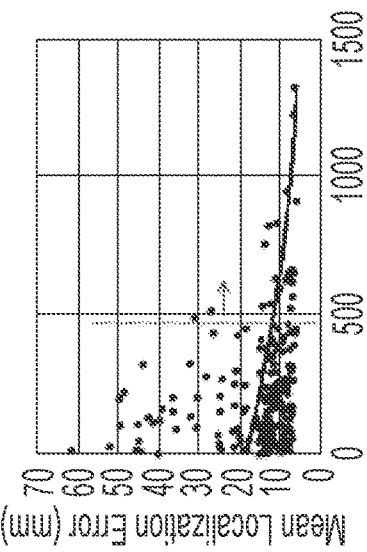

FIG. 4 shows results of validating a methodology of real-time guidance of an electrophysiology catheter for targeting a location of origin of an arrhythmia applied to an example left ventricle (LV) during pacing at the ventricles from different locations. To further calibrate and validate the methodological algorithm, a 12-lead ECG pacing system is employed to an example LV to generate a plurality sets of ECG signals corresponding to known locations, for example while pacing from 10 different known locations in the LV, as shown in graphs 402. As described above, a set of ECG signals correspond to one pacing location, and may comprise n components (e.g., n signals) if the ECG pacing system is an n-lead ECG pacing system. In this example, the n-lead ECG system is a 12-lead ECG pacing system. Thus, a set of ECG signals in this example comprise 12 ECG signals from one pacing location.

ECG signals from 4 to 8 known pacing locations (referred as training pacing sites in graph 404) may be used to predict the locations of the remaining known pacing locations (referred as remaining validation sites). With ECG signals from 4 to 8 known pacing locations, an operator A may be derived. For example, let $x_i$ be the n-dimensional ECG integral displacement vector between a pair of the 4 to 8 pacing locations and $y_i$ the 3-dimensional Euclidian displacement vector between the same pair of locations. If there are a total of m possible pairs between the 4 to 8 pacing location, an m by n ECG integral displacement matrix X can be defined that has each possible n-dimensional vector $x_i$ at a row (total of m rows). An m by 3 Euclidian displacement matrix Y can be defined that has each possible 3-dimensional vector $y_i$ as a row (total of m rows). The operator A can then be calculated using the normal equation as the product $A=(X^TX+\lambda I)^+X^TY$, where $X^T$ denotes the transpose of the matrix X, λ denotes a regularization parameter that is greater or equal to zero, I is the identity matrix, and $(\ )^+$ denotes the Moore-Penrose pseudo-inverse. The operator A is an n by 3 matrix where n is the number of electrocardiographic leads.

Once the operator A is determined, the operator can be employed in the Y=A·X to derive a 3D Euclidian displacement vector showing a direction and a distance from a first pacing location to a second pacing location. For example, in graph 404, the 3D Euclidian displacement vector from the pacing location 404a to the pacing location 404b can be validated, where a set of n-lead ECG signals from the pacing location 404a and a set of n-lead ECG signals from the pacing location 404b are known such that an n-dimensional ECG integral displacement vector is derived between the pacing location 404a and the pacing location 404b. By following the 3D displacement vector from the pacing location 404a to the pacing location 404b, the catheter is moved to the location 404b which is approaching closer to the target location 404c.

In some embodiments, a prediction error of moving the catheter may be reduced by covering more volume of a patient heart. That is, a larger volume of the patient heart may need to be pace mapped. As shown in the graph 406, a prediction error of less than 1 centimeter can be achieved by covering as least 500 mm³ of the LV cavity volume.

In some embodiments, a prediction error of moving the catheter may be reduced by specifying a suitable integral time period for deriving the n-dimensional ECG integral displacement vector. As shown in the graph 408, the prediction error may be reduced by specifying the integral time duration from about 0 millisecond to about 80-100 milliseconds.

Figure 5:
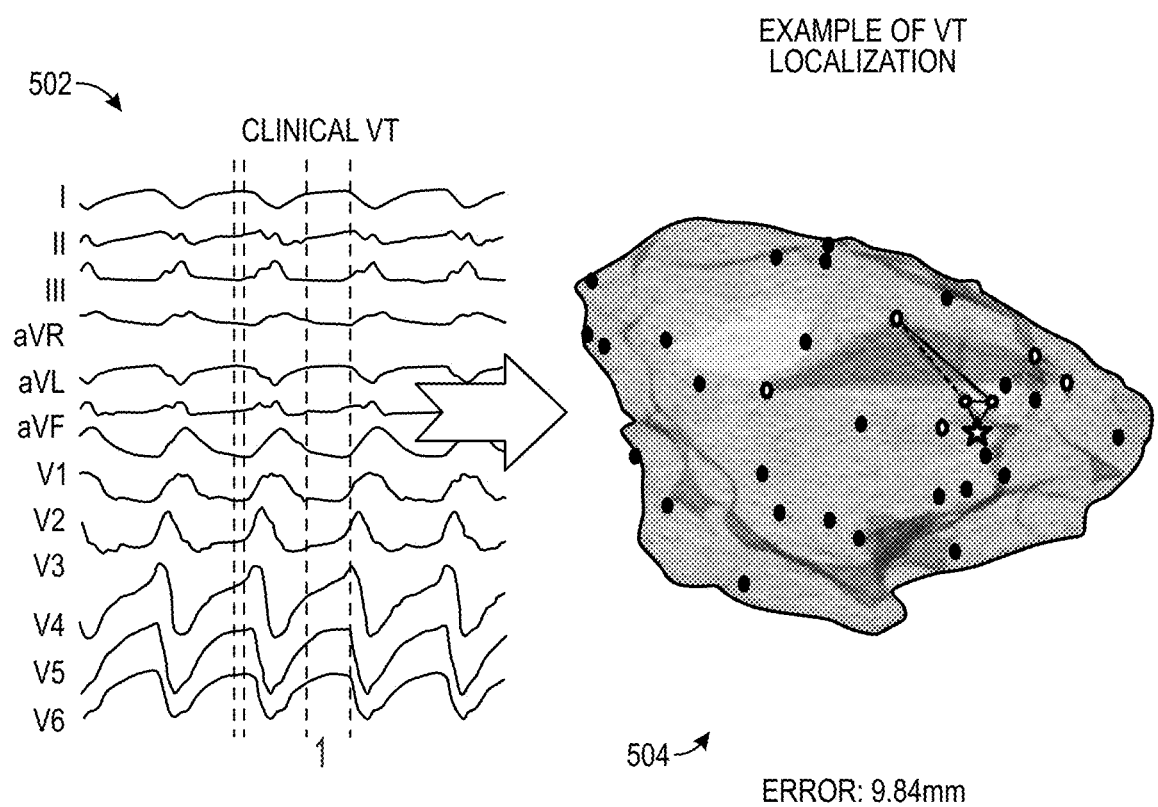
FIG. 5 shows an example of VT localization by employing systems disclosed herein.
Figure 5:
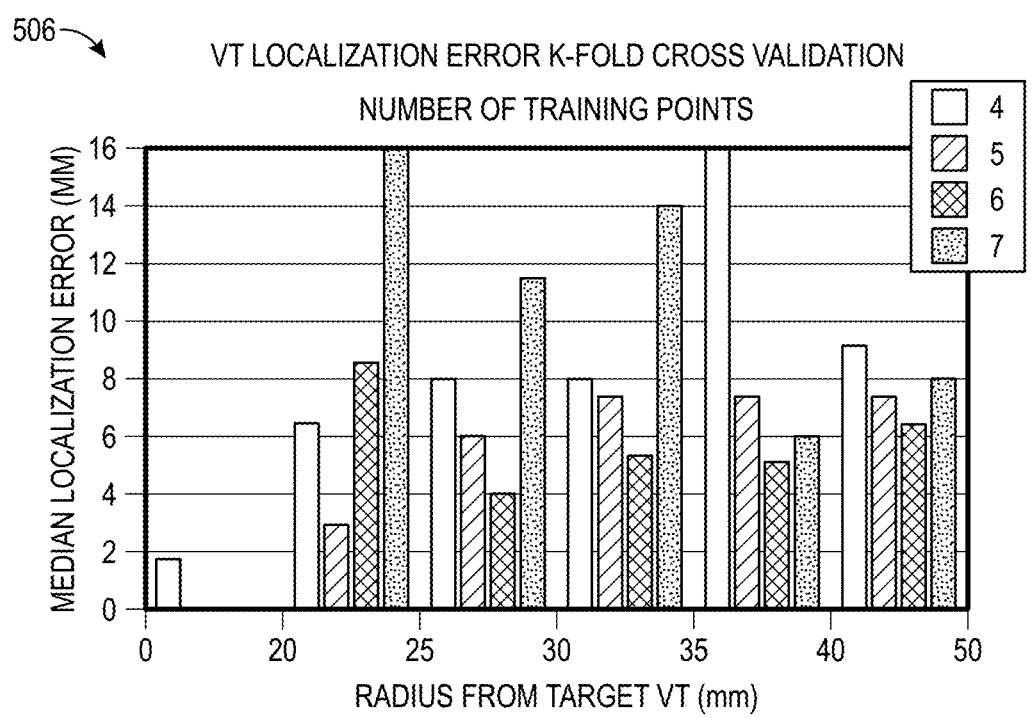

FIG. 5 shows an example of ventricular tachycardia (VT) localization by employing the system and algorithm described above. A set of clinical ECG signals 502 of a target VT are collected and received into a system where a catheter is operated and moved toward a target unknown location of the VT. A diagram 504 of a patient heart image is shown on which movement of the catheter is displayed. A direction and distance of the catheter to be moved is defined as a 3D physical displacement vector. As described above, the 3D physical displacement vector can be derived from a transform operator A and a 12D ECG integral displacement vector. The 12D ECG integral displacement vector can be derived by integrating over a period of time a difference between each component signal of the set of clinical ECG signals and each corresponding component signal of a set of ECG signals at a pacing location (e.g., a latest pacing location of the catheter). The diagram 506 displays localization error of the target VT. As shown in the diagram 506, the location error can change with a physical radius distance from the unknown target VT location.

Figure 6:
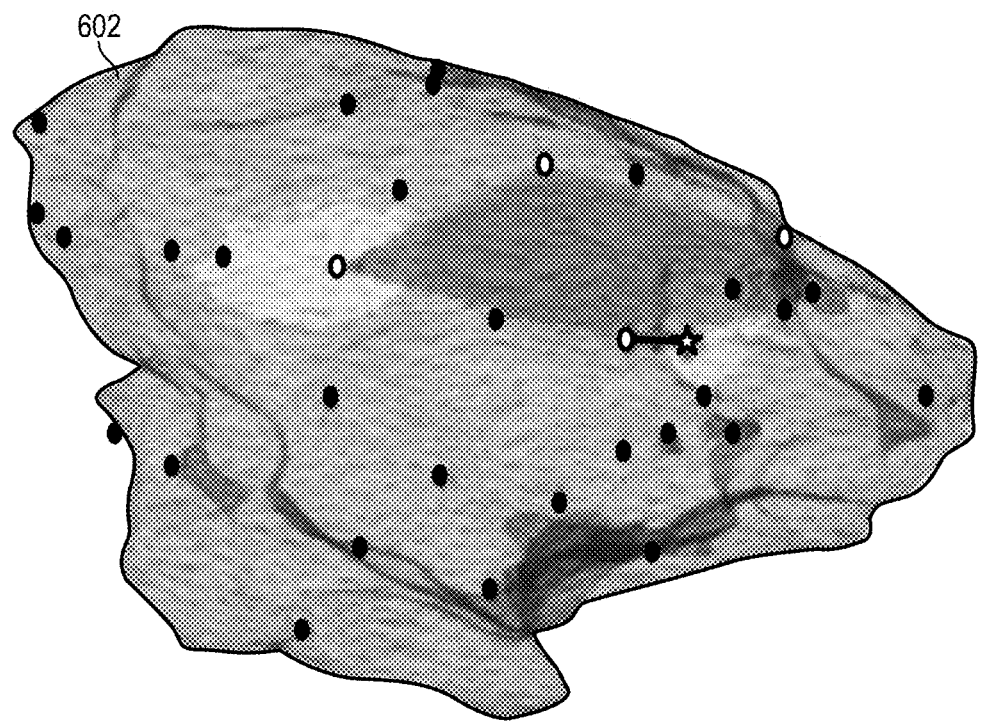
FIG. 6 shows effect of the number of pacing locations on localization error of a target arrhythmia.
Figure 6:
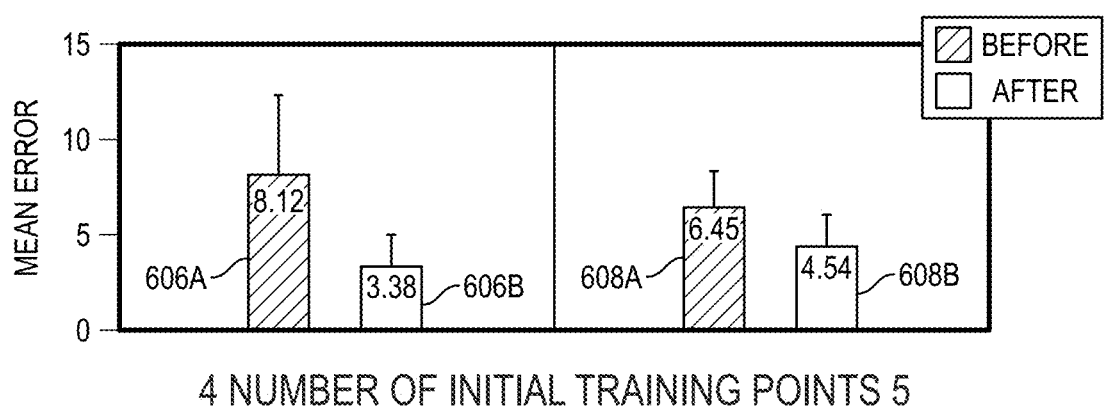

In some embodiments, localization error of VT can be improved by including an additional pacing location in the derivation of the transform operator A, that is at close proximity to the initial prediction of the VA location. For example, in FIG. 6, addition of a pacing point near the predicted VA location can significantly reduce localization error. The diagram 602 shows predictions of VA locations with 4 and 5 pacing points. Localization error after an additional pacing point (diagrams 608*b* and 608*b*) is reduced significantly from localization error before the additional pacing point (diagrams 606*a* and 606*a*).

Figure 7:
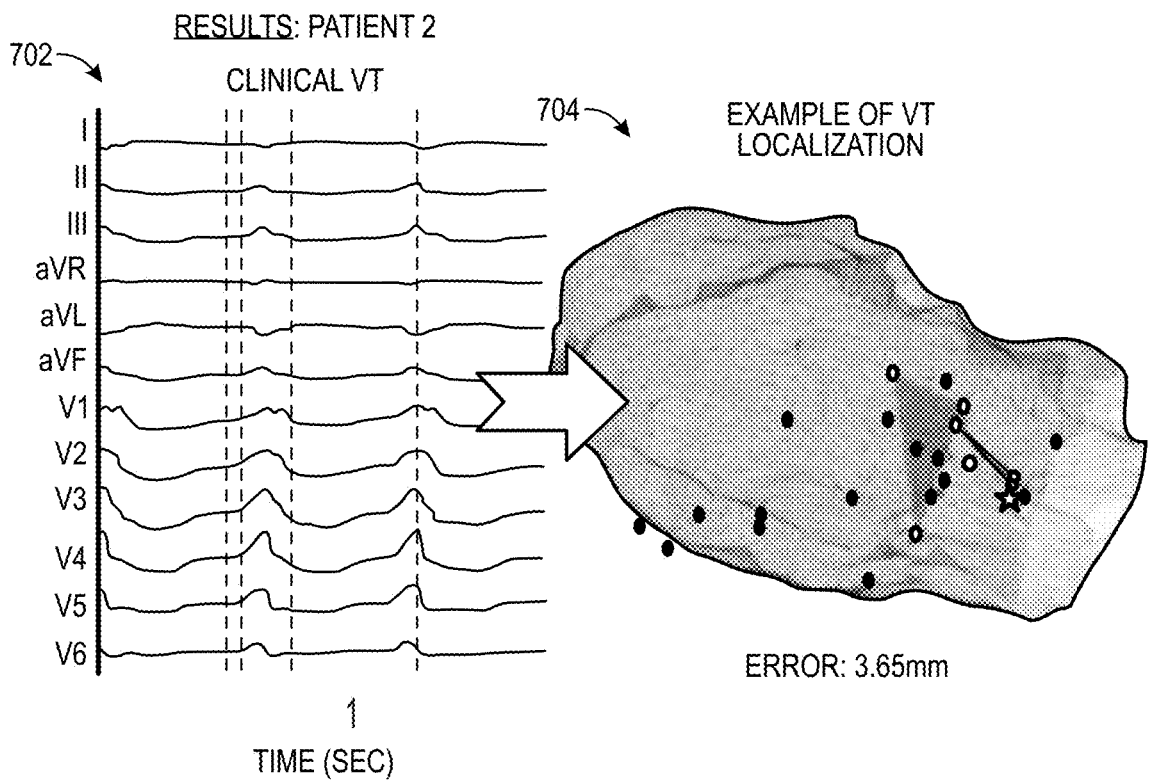
FIG. 7 shows another example of VT localization by employing systems disclosed herein.
Figure 7:
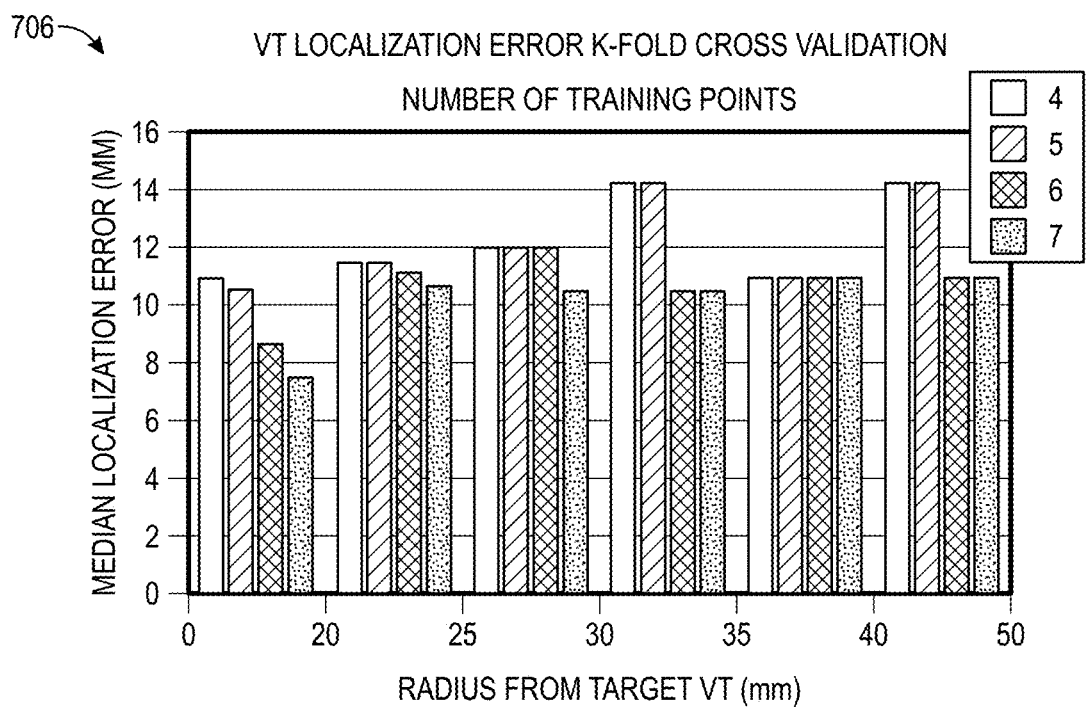

FIG. 7 shows another example of ventricular tachycardia (VT) localization by employing the system and algorithm described above. A set of clinical ECG signals 702 of a target VT on a patient are collected and received into a system where a catheter is operated and moved toward a target unknown location of the VT. A diagram 704 of the patient's heart image is shown on which movement of the catheter is displayed. A direction and distance of the catheter to be moved is defined as a 3D physical displacement vector. As described above, the 3D physical displacement vector can be derived from a transform operator A and a 12D ECG integral displacement vector. The 12D ECG integral displacement vector can be derived by integrating over a period of time a difference between each component signal of the set of clinical ECG signals and each corresponding component signal of a set of ECG signals at a pacing location (e.g., a latest pacing location of the catheter).

The diagram 706 displays localization error of the target VT. As shown in the diagram 706, the location error can change with a physical radius distance from the unknown target VT location.

Figure 8:
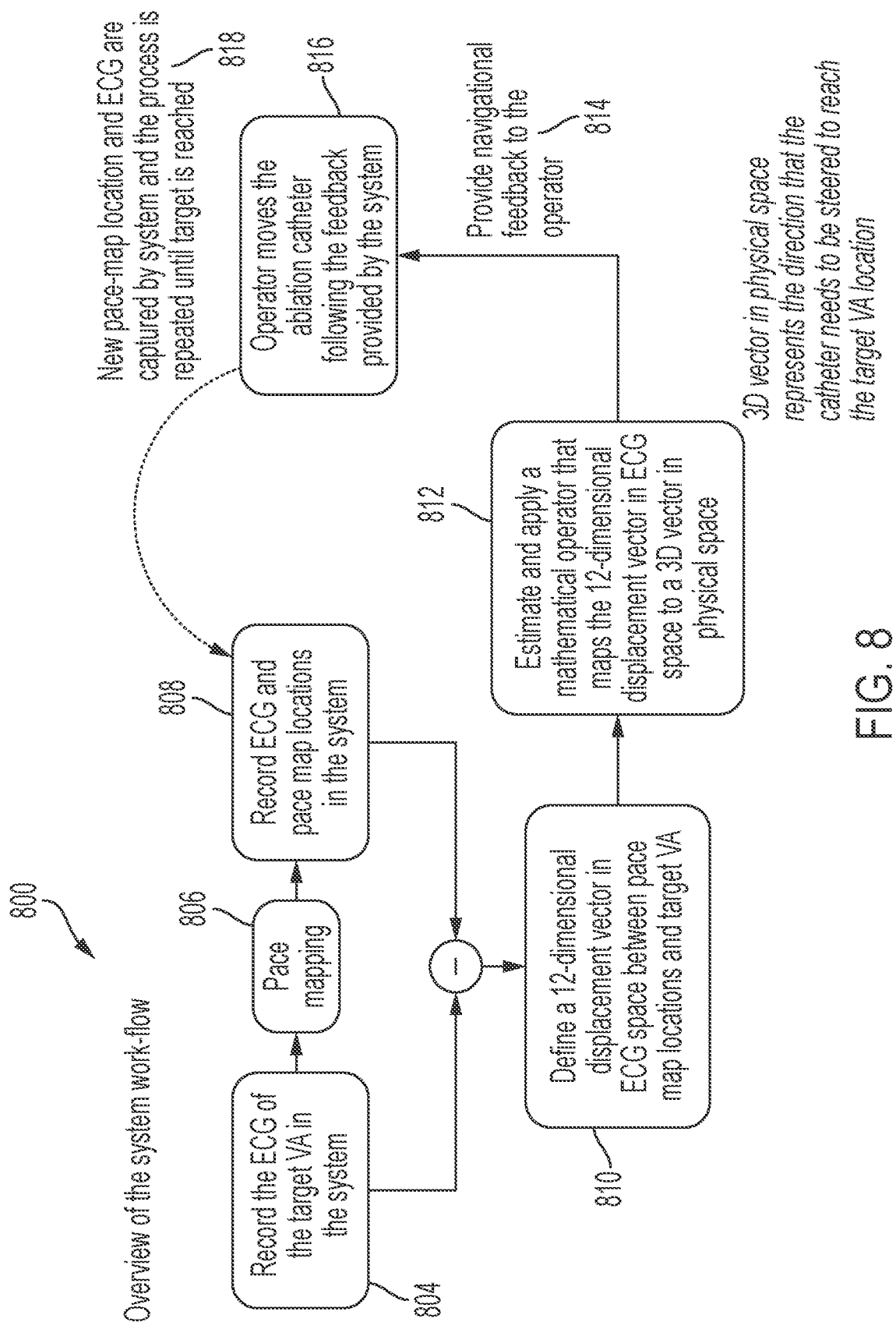
FIG. 8 shows an overview of an example system workflow, according to an embodiment of the current invention.

FIG. 8 shows an overview of work-flow 800 of an example system, according to the current invention. The work-flow 800 includes: recording ECG signals of a target VA in the example system (block 804); then pace mapping locations in the system to record ECG signals of the paced locations (blocks 806 and 808); defining 12-dimensional displacement vectors in ECG space from ECG signals of pairs of locations, for example, a pair of paced locations or a pair of one paced location and the location of the target VA (block 810); constructing a mathematical operator from 12-dimensional displacement vectors of the ECG signals integral of pairs of paced locations, and applying the mathematical operator to the 12-dimensional displacement vectors of the ECG signals integral between one paced location and the location of the target VA to derive a 3D physical displacement vector directing from the one paced location toward the location of the target VA (block 812); providing navigational feedback to an operator of the catheter to steer and move the catheter from the one paced location to the location of the target VA by following the 3D physical displacement vector (blocks 814 and 816); and new pace-map location and its corresponding ECG signals are captured by the system and the work-flow is repeated until the target VA location is reached (block 818).

Figure 9:
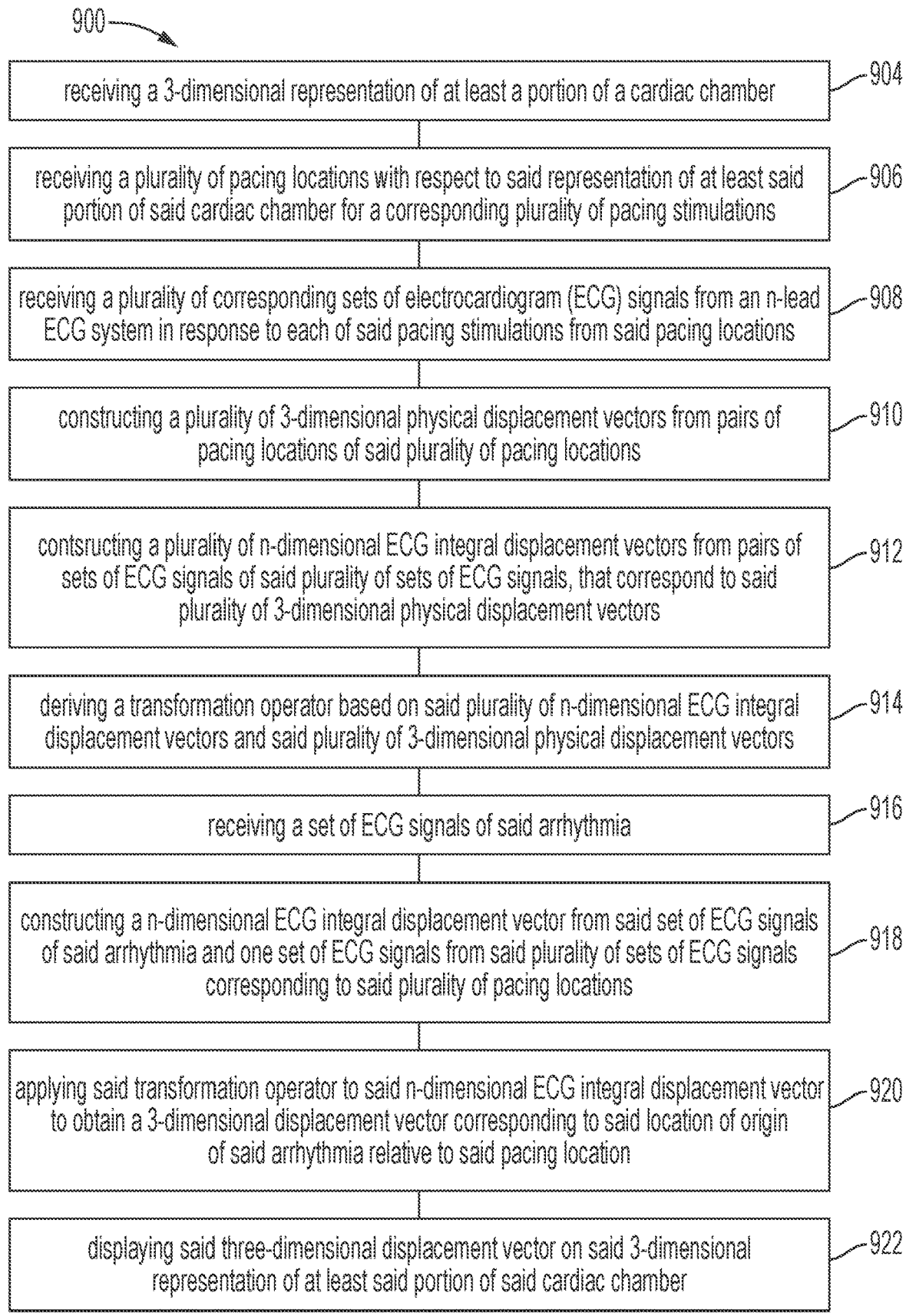
FIG. 9 is a flowchart illustrating a method of real-time guidance of an electrophysiology catheter for targeting a location of origin of an arrhythmia, according to an embodiment of the current invention.

FIG. 9 is a flowchart illustrating a method 900 of real-time guidance of an electrophysiology catheter for targeting a location of origin of an arrhythmia according to an embodiment of the current invention. The method 900 includes receiving a 3-dimensional representation of at least a portion of a cardiac chamber (step 904); receiving a plurality of pacing locations with respect to said representation of at least said portion of said cardiac chamber for a corresponding plurality of pacing stimulations (step 906), for example, a catheter is used to perform the corresponding plurality of pacing stimulations at the plurality of pacing locations; receiving a plurality of corresponding sets of electrocardiogram (ECG) signals from an n-lead ECG system in response to each of said pacing stimulations from said pacing locations (step 908), for example, a set of ECG signals may be produced at a corresponding pacing location, and the set of ECG signals may include 12 signal components when the n-lead ECG system is a 12-lead system; constructing a plurality of 3-dimensional physical displacement vectors from pairs of pacing locations of said plurality of pacing locations (step 910), for example, a 3D physical displacement vector may be constructed from a pair of pacing locations; constructing a plurality of n-dimensional ECG integral displacement vectors from pairs of sets of ECG signals of said plurality of sets of ECG signals, that correspond to said plurality of 3-dimensional physical displacement vectors (step 912), for example, a n-dimensional ECG integral displacement vector can be constructed from a pair of sets of ECG signals of a pair of pacing locations by integrating over a period of time ECG differences between the pair of sets of ECG signals as described above; deriving a transformation operator based on said plurality of n-dimensional ECG integral displacement vectors and said plurality of 3-dimensional physical displacement vectors (step 914), as described above; receiving a set of ECG signals of said arrhythmia (step 916); constructing a n-dimensional ECG integral displacement vector from said set of ECG signals of said arrhythmia and one set of ECG signals from said plurality of sets of ECG signals corresponding to said plurality of pacing locations (step 918); and applying said transformation operator to said n-dimensional ECG integral displacement vector to obtain a 3-dimensional displacement vector corresponding to said location of origin of said arrhythmia relative to said pacing location (step 920); and displaying said three-dimensional displacement vector on said 3-dimensional representation of at least said portion of said cardiac chamber (step 922).

The set of ECG signals from said location corresponding to said arrhythmia can be generated from said n-lead ECG system or another n-lead ECG system that is different than said n-lead ECG system. A direction and a distance of said three-dimensional displacement vector indicates a direction and a distance for said catheter to be moved from said one pacing location to said location of origin of said arrhythmia. The one pacing location may be the most recent pacing location. The plurality of pacing locations may comprise at least 4 pacing locations.

In some embodiments, a system and method for guidance of catheter positioning in a cardiac chamber for treating an arrhythmia are provided. A 3-dimensional representation of at least a portion of the cardiac chamber is acquired. A catheter with mechanism for steering and pacing is placed into or outside of said cardiac chamber. A plurality of n electrocardiographic (ECG) signals are acquired while at least 1 pacing pulse is applied to said catheter at a pacing site in or around said cardiac chamber. A plurality of n ECG signals are acquired during the arrhythmia. An n-dimensional ECG displacement vector between said arrhythmia and said pacing site is determined. A transformation operator between the n-dimensional ECG vector space and 3-dimensional space of said cardiac chamber is determined. Direction and distance for said catheter to be moved from said pacing site to source of said arrhythmia is determined using said transformation operator to transform said n-dimensional ECG displacement vector between arrhythmia and said pacing site into a 3-dimensional displacement vector. Said 3-dimensional displacement vector is displayed onto said 3-dimensional representation of at least a portion of said cardiac chamber.

Also disclosed herein is a computer-readable medium for real-time guidance of an electrophysiology catheter for targeting a location of origin of an arrhythmia. The computer-readable medium comprises non-transitory computer-executable code which, when executed by a computer, causes the computer to perform the above methods and other steps.

Further disclosed herein is a system for real-time guidance of an electrophysiology catheter for targeting a location of origin of an arrhythmia. The system may comprise a data processor, wherein said data processor is configured to perform the above methods and other steps.

The above provides some examples according to particular embodiments of the current invention. The broad concepts of the current invention are not limited to only these particular examples.

The embodiments discussed in this specification are intended to explain concepts of the invention. However, the invention is not intended to be limited to the specific terminology selected and the particular examples described. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:

1. A method of real-time guidance of an electrophysiology catheter for targeting a location of origin of an arrhythmia, comprising:
    receiving, by a processor, a three-dimensional representation of at least a portion of a cardiac chamber;
    receiving, by the processor, a plurality of pacing locations with respect to said three-dimensional representation of at least said portion of said cardiac chamber for a corresponding plurality of pacing stimulations;
    receiving, by the processor, a plurality of corresponding sets of electrocardiogram (ECG) signals from an n-lead ECG system in response to each of said pacing stimulations from each of said pacing locations;
    constructing, by the processor, a plurality of three-dimensional physical displacement vectors from pairs of pacing locations of said plurality of pacing locations;
    constructing, by the processor, a plurality of n-dimensional ECG integral displacement vectors from pairs of sets of ECG signals of said plurality of corresponding sets of ECG signals;
    deriving, by the processor, a transformation operator based on said plurality of n-dimensional ECG integral displacement vectors and said plurality of three-dimensional physical displacement vectors, wherein the transformation operator maps n-dimensional displacement vectors in ECG space to three-dimensional displacement vectors in physical space;
    receiving, by the processor, an n-lead ECG of said arrhythmia;
    constructing, by the processor, an n-dimensional ECG integral displacement vector from said n-lead ECG of said arrhythmia and one set of ECG signals from said plurality of corresponding sets of ECG signals;
    applying, by the processor, said transformation operator to said n-dimensional ECG integral displacement vector to obtain a three-dimensional displacement vector in a direction of said location of origin of said arrhythmia and corresponding to said location of origin of said arrhythmia relative to said pacing location; and
    displaying, by the processor, said three-dimensional displacement vector in the direction of said location of origin of said arrhythmia on said three-dimensional representation of at least said portion of said cardiac chamber.

2. The method of claim 1, wherein said n-lead ECG of said arrhythmia is generated from said n-lead ECG system.

3. The method of claim 1, wherein a direction and a distance of said three-dimensional displacement vector indicates a direction and a distance for said catheter to be moved from said one pacing location to said location of origin of said arrhythmia.

4. The method of claim 1, wherein said one pacing location is a most recent pacing location.

5. The method of claim 1, wherein said plurality of pacing locations comprises at least four pacing locations.

6. A computer-readable medium for real-time guidance of an electrophysiology catheter for targeting a location of origin of an arrhythmia, said computer-readable medium comprising non-transitory computer-executable code which, when executed by a computer, causes the computer to:
    receive a three-dimensional representation of at least a portion of a cardiac chamber;
    receive a plurality of pacing locations with respect to said three-dimensional representation of at least said portion of said cardiac chamber for a corresponding plurality of pacing stimulations;
    receive a plurality of corresponding sets of electrocardiogram (ECG) signals from an n-lead ECG system in response to each of said pacing stimulations from each of said pacing locations;
    construct a plurality of three-dimensional physical displacement vectors from pairs of pacing locations of said plurality of pacing locations;
    construct a plurality of n-dimensional ECG integral displacement vectors from pairs of sets of ECG signals of said plurality of corresponding sets of ECG signals;
    derive a transformation operator based on said plurality of n-dimensional ECG integral displacement vectors and said plurality of three-dimensional physical displacement vectors, wherein the transformation operator maps n-dimensional displacement vectors in ECG space to three-dimensional displacement vectors in physical space;
    receive an n-lead ECG of said arrhythmia;
    construct an n-dimensional ECG integral displacement vector from said n-lead ECG of said arrhythmia and one set of ECG signals from said plurality of corresponding sets of ECG signals;
    apply said transformation operator to said n-dimensional ECG integral displacement vector to obtain a three-dimensional displacement vector in a direction of said location of origin of said arrhythmia and corresponding to said location of origin of said arrhythmia relative to said pacing location; and
    display said three-dimensional displacement vector on said three-dimensional representation of at least said portion of said cardiac chamber.

7. The computer-readable medium of claim 6, wherein said one pacing location is the most recent pacing location.

8. The computer-readable medium of claim 6, wherein a direction and a distance of said three-dimensional displacement vector indicates a direction and a distance for said catheter to be moved from said one pacing location to said location of origin of said arrhythmia.

9. The computer-readable medium of claim 6, wherein said plurality of pacing locations comprises at least 4 pacing locations.

10. The computer-readable medium of claim 6, wherein said n-lead ECG of said arrhythmia is generated from said n-lead ECG system.

11. A system for real-time guidance of an electrophysiology catheter for targeting a location of origin of an arrhythmia comprising a data processor, wherein said data processor is configured to:
   receive a three-dimensional representation of at least a portion of a cardiac chamber;
   receive a plurality of pacing locations with respect to said three-dimensional representation of at least said portion of said cardiac chamber for a corresponding plurality of pacing stimulations;
   receive a plurality of corresponding sets of electrocardiogram (ECG) signals from an n-lead ECG system in response to each of said pacing stimulations from each of said pacing locations;
   construct a plurality of three-dimensional physical displacement vectors from pairs of pacing locations of said plurality of pacing locations;
   construct a plurality of n-dimensional ECG integral displacement vectors from pairs of sets of ECG signals of said plurality of corresponding sets of ECG signals;
   derive a transformation operator based on said plurality of n-dimensional ECG integral displacement vectors and said plurality of three-dimensional physical displacement vectors, wherein the transformation operator maps n-dimensional displacement vectors in ECG space to three-dimensional displacement vectors in physical space;
   receive an n-lead ECG of said arrhythmia;
   construct an n-dimensional ECG integral displacement vector from said n-lead ECG of said arrhythmia and one set of ECG signals from said plurality of corresponding sets of ECG signals;
   apply said transformation operator to said n-dimensional ECG integral displacement vector to obtain a three-dimensional displacement vector in a direction of said location of origin of said arrhythmia and corresponding to said location of origin of said arrhythmia relative to said pacing location; and
   display said three-dimensional displacement vector on said three-dimensional representation of at least said portion of said cardiac chamber.

12. The system of claim 11, wherein said n-lead ECG of said arrhythmia is generated from said n-lead ECG system.

13. The system of claim 11, wherein said direction and a distance of said three-dimensional displacement vector indicates a direction and a distance for said catheter to be moved from said one pacing location to said location of origin of said arrhythmia.

14. The system of claim 11, wherein said one pacing location is the most recent pacing location.

15. The system of claim 11, wherein said plurality of pacing locations comprises at least 4 pacing locations.

* * * * *